INVENTORS
Guy. H. Coulter
Charles E. Godley
By Braselton, Whitcomb Davies
Attorneys Patented Apr. 19, 1938

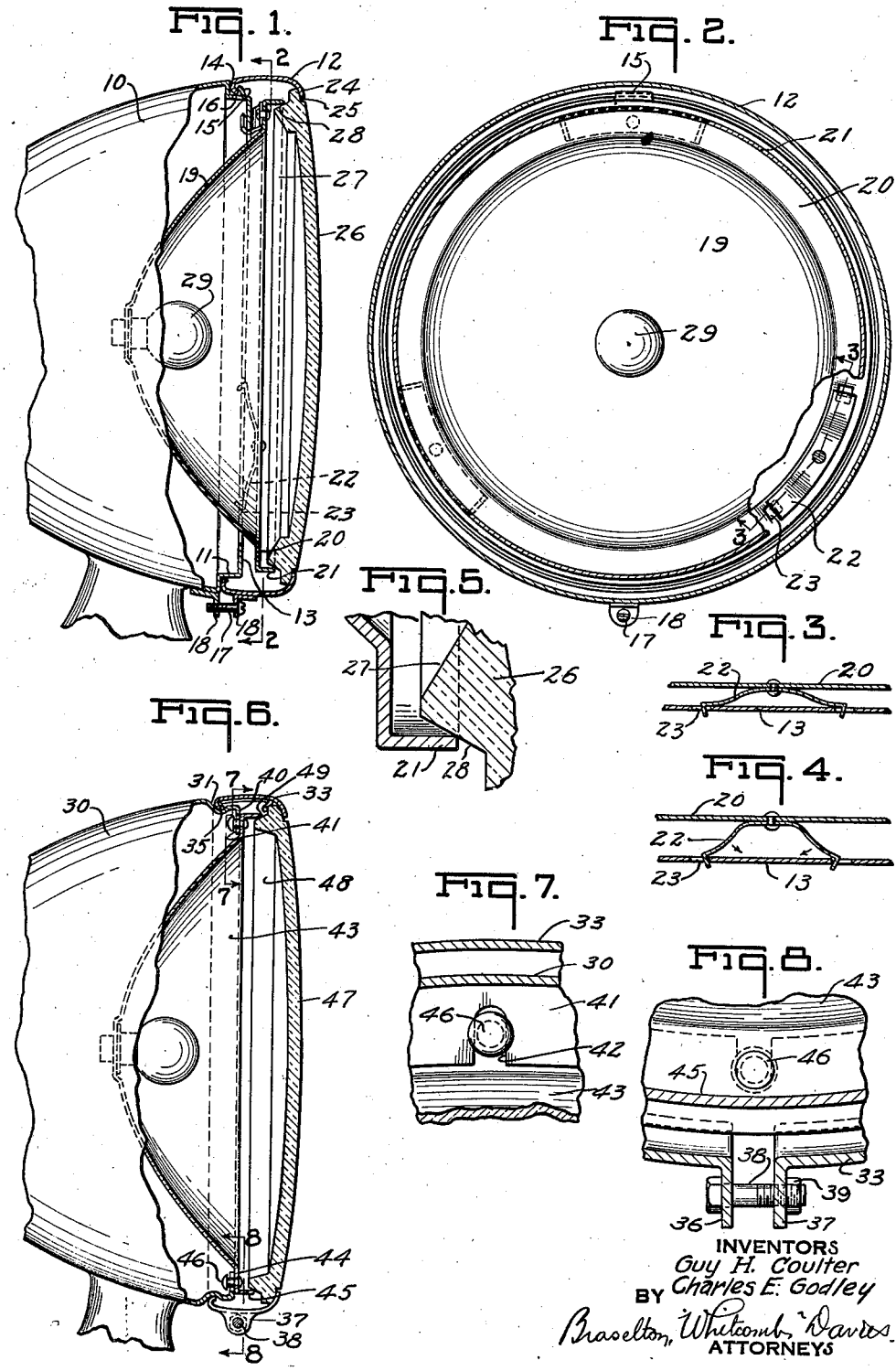

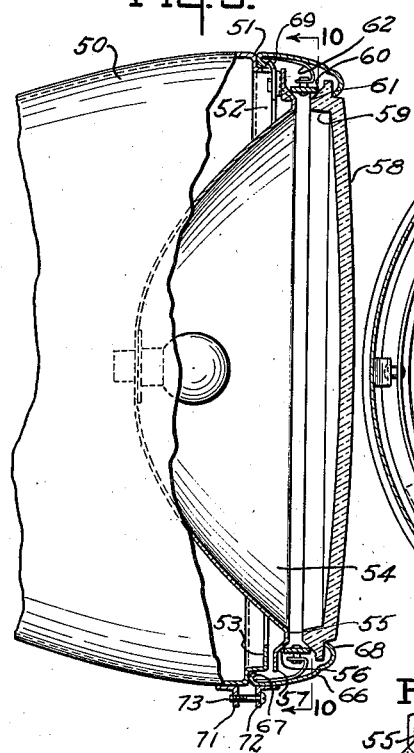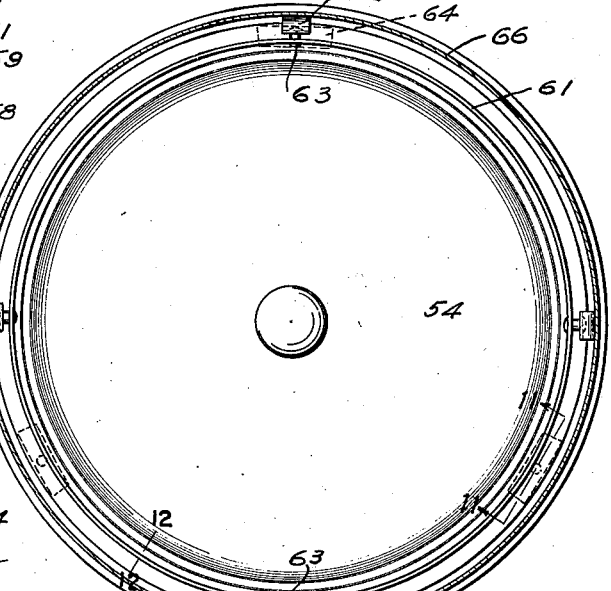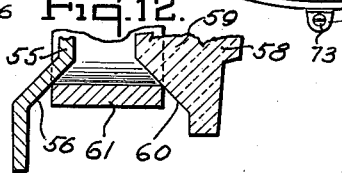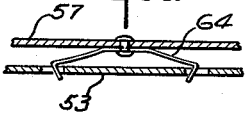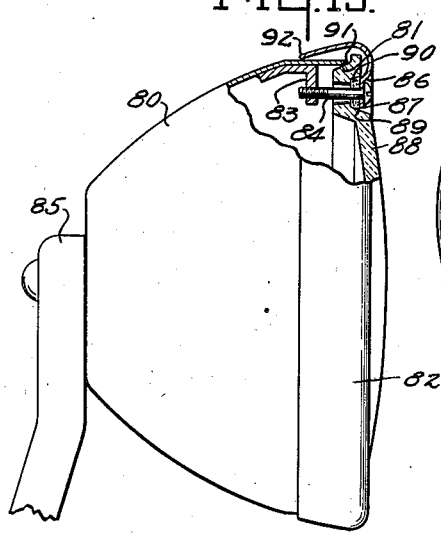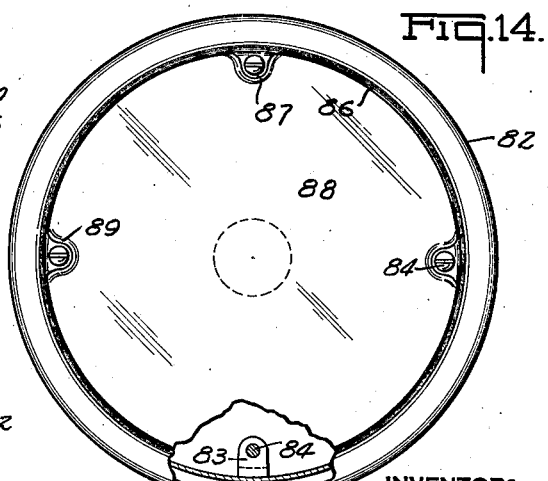
INVENTORS
Guy H. Coulter
Charles E. Godley
BY
Braselton, Whitcomb Davies
ATTORNEYS April 19, 1938.　　G. H. COULTER ET AL　　2,114,957
SEALING MEANS
Filed Jan. 25, 1935　　3 Sheets-Sheet 3

2,114,957

UNITED STATES PATENT OFFICE 2,114,957

SEALING MEANS

Guy H. Coulter and Charles E. Godley, Highland Park, Mich., assignors to United Lens Corporation, Detroit, Mich., a corporation of Delaware Application January 25, 1935, Serial No. 3,406

2 Claims. (Cl. 240—41.5)

This invention relates to sealing means and particularly to an arrangement of parts for producing a moisture-proof unit and has special use with casings employed for enclosing light emitting devices.

The invention embraces the provision of a novel method of securing the component parts of a housing used for a light emitting device in such a manner as to form an effective line contact, thus overcoming any irregularities of their contacting surfaces forming thereby a hermetically sealed moist-proof structure.

Another object of the invention is to provide readily removable closure securing means for permitting easy access to enclosed elements of a light emitting device.

A further object of the invention is to provide a closure and sealing means therefor, simple in construction and minimizing the number of parts, and eliminating packing means or gaskets.

Further objects and advantages are within the scope of the invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is a fragmentary side view of a headlight illustrating a form of the invention with certain portions in section;

Figure 2 is a sectional detail view taken substantially on a line 2—2 of Figure 1;

Figure 3 is a sectional detail view taken substantially on a line 3—3 of Figure 2 with the reflector locating elements in compressed relation;

Figure 4 is a view similar to Figure 3 with the elements in expanded relation;

Figure 5 is an enlarged detail view of the sealing arrangement illustrated in Figure 1;

Figure 6 is a view similar to Figure 1 showing another form of the invention;

Figure 7 is an enlarged sectional detail taken substantially on a line 7—7 of Figure 6;

Figure 8 is an enlarged sectional detail taken substantially on a line 8—8 of Figure 6;

Figure 9 is a view similar to Figure 1 illustrating a further form of the invention;

Figure 10 is a sectional detail view taken substantially on a line 10—10 of Figure 9;

Figure 11 is a sectional detail view taken substantially on a line 11—11 of Figure 10;

Figure 12 is an enlarged sectional detail view showing the sealing arrangement illustrated in Figure 9;

Figure 13 is a side view of a tail or signal lamp with portions broken away and in section to illustrate another form of the invention;

Figure 14 is a front view of the lamp shown in Figure 13 with a portion broken away and portions in section;

Figure 15:
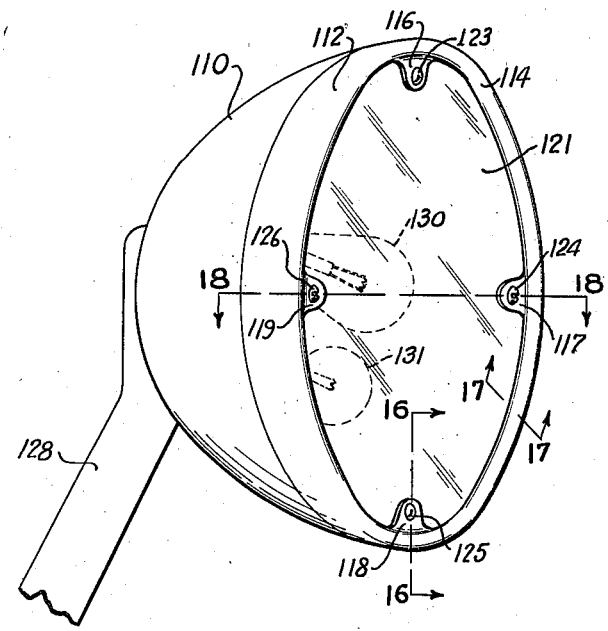
Figure 15 is a perspective view of a device similar to that shown in Figure 13 which incorporates a still further form of the invention.

This invention may be included in many types of closures and for a practical application of the principle of the invention we have illustrated the same as incorporated in several light projecting devices usable with automotive vehicles. It is understood, however, that the invention should not be limited to the particular arrangement illustrated, but that its use is contemplated wherever the same may be found to have utility.

Referring to the drawings and particularly Figures 1 to 5 thereof, the structure illustrated as embodying the invention is shown in the form of a vehicle headlight and comprises an outer metallic open ended housing or casing 10 having a rim 12 removably secured to the casing. The open end of casing 10 is preferably formed with an extension 11 of reduced diameter having an inturned flange portion 13, a shoulder 14 being formed intermediate the casing 10 and extension 11 to support the rim 12. Extension 11 is provided with a projection 15 with which projection, an inturned edge 16 of rim 12 is engageable to hold the latter in position. The rim 12 is further secured in place by means such as a screw 17. A pair of spaced projections or ears 18 are provided on the rim and casing, one of which is threaded to receive the screw 17, the other being bored to freely receive the screw.

Positioned within the opening provided by the flange 13 is a reflector 19 having a flanged portion 20 terminating in an annular extension 21, preferably of comparatively thin yieldable material. A plurality of flat springs or expansible members 22 are secured to flange 20 in a suitable manner as by riveting. Members 22 are preferably equally spaced and the extremities thereof are received in openings 23 provided in the flange 13 to properly position the reflector with respect thereto.

The rim 12 is provided with an inturned annular edge 24, the inner surface of which is in engagement with a peripheral annular surface 25 of a lens or light penetrating wall 26 which may be constructed of glass or other suitable material, and which serves as a removable closure for the open ends of the casing 10. The lens 26 is provided with an enlarged ring-like projection 27 having a beveled or angularly formed smooth wall 28. The projection 27 is adapted to be circumferentially received within the extension 21 of the reflector 19 so that the inner edge of the extension 21 engages the lens forming substantially a positive line contact with the non-yieldable bevel 28.

In order to permit access to the outer end of casing 10 for the purpose of inspecting, repairing or replacing the source of illumination such as a bulb 29 and any other of the associated parts, the rim 12 and lens 26 are arranged so as to be readily removed by removing screw 17. The reflector is then accessible, being loosely positioned by the springs 22.

The sealing means of this form of the invention used to produce a hermetically moist-proof casing having a readily removable closure consists primarily in making the contacting surface of the closure smooth and at an angle with respect to a portion of the reflector with which it is engageable, so that one edge of the reflector position forms a single line contact with the angularly displaced surface of the closure with which it is urged into engagement, these surfaces being forced into tight engagement whereby one of the surfaces tends to expand the yieldable portion of the reflector producing an effective and positive contact therebetween.

Another form of the invention is particularly illustrated in Figures 6 to 8 where it can be seen that a casing 30 has an annular groove 31 adjacent its open end which groove receives an inwardly bent portion 35 of a rim member 33. The rim 33 serves to position and removably secure a light emitting closure or lens 47. The open end of the casing is inturned as at 40 to form a reflector positioning flange 41 having a plurality of open ended slots 42 therein to removably position a reflector 43. The reflector 43 is formed with a depending portion 44 terminating in a circumferentially flexible annular projection or extension 45. A plurality of pins 46 riveted or otherwise secured to the flange 44, are adapted to be received within the slots 42 and serve to position the reflector with respect to the casing. One of the slots 42 is sufficiently long so that the reflector may be removed from the casing by moving the reflector toward the closed end of the slot which frees the pin 46 from the opposite slot 42 as illustrated in Figure 7.

The lens 47 is provided with an inwardly projecting annular ring portion 48, having a beveled surface 49 which is angularly disposed, and adapted to engage the annular extension 45 by the pressure exerted by rim 33. The rim 33 is of the split type, the free ends being formed with angularly disposed projections or lugs 36 and 37 having openings therein to receive a bolt 38 to which is secured a tightening nut 39. The outer end portion of the rim 33 is curved as at 34 to engage a similarly curved edge portion of the lens 47. By this arrangement the rim when tightened by the action of the bolt 38 and nut 39, tending to reduce its diameter, will not only hold the lens in proper position in the casing, but will exert pressure upon the lens through the contacting curved portions of the lens and rim to urge the beveled lens portion 49 into contact with the extension 45. This tightening action of the rim 33 will urge the circumferentially flexible flange 45 into an effective line contact with the angularly disposed surface 49 of lens 47 causing an outwardly expanding action of end portion of the flange producing a perfect engagement therebetween and thus providing a perfect fit between the contacting surfaces, producing a moisture and water-proof seal without the use of compressible or resilient material.

Another form of the invention is illustrated in Figures 9 to 12 wherein a casing 50 is provided with an annular shoulder 51, reduced extension 52 and an inturned flange 53 similar to that shown in Figure 1. However, in this form of the invention, the reflector 54 is provided with a flanged portion 55 angularly disposed as at 56 and terminating in a radial portion 57. A lens 58 is formed with a ring-like projection 59 a wall of which is angularly disposed as at 60. Between the wall 60 of lens 58 and wall 56 of flange 55 is positioned an annulus or ring 61 the edges of which engage portions of the walls.

A rim 66 has inturn edge portions 67 and 68, the edge 67 being engageable with a projection 69 formed in the extension 52 of the casing which arrangement serves to position the rim with respect to the casing. Lugs 71 and 72 on casing 50 and rim 66 respectively and screw 73 serve as means to lock the rim in place in the usual manner.

The ring 61 is preferably positioned adjacent the reflector and lens by means such as the spring elements 62 which may be riveted to the ring as at 63. The reflector 54 is positioned with respect to the casing by members 64 in a manner similar to that described in connection with Figures 1 and 2. In Figure 12 it can be seen that the inner edges of ring 61 engages the walls 56 and 60 forming a line contact therewith. By providing a ring 61 which is somewhat flexible it will readily conform to the surfaces of the walls forming a tight joint, the members 64 constantly urging the reflector toward the lens and thus tending to increase the contact between the ring 61, reflector and lens.

Referring now to Figures 13 and 14 of the drawings, the arrangement illustrated as embodying the invention is shown in the form of a signal device for vehicles and comprises an outer metallic open ended housing or casing 80 having removably secured at its open end 81, a rim 82. Adjacent the open end 81 of casing 80 are fixedly secured at its inner surface a plurality of brackets or supports 83, which serve to removably secure rim 82 to casing 80 through the medium of screws 84. A support or bracket 85 is secured to the rear of the casing 80 and serves to secure the device to a convenient portion of a vehicle.

The rim 82 is provided with an inturned or rolled annular edge 86, which is formed with a plurality of inwardly projecting lugs 87, each having an opening therein. The inner surface of the rolled edge 86 is in engagement with the outer surface of a lens or light penetrating wall 88 which may be constructed of glass or other suitable material and being provided with suitable recesses such as 89 to accommodate the lugs 87. The lens 88 is formed with suitable openings which are in alignment with the openings formed in the inwardly projecting lugs 87 in order to allow the passage of the screws 84, gaskets or washers 90 being interposed between the recesses 89 and lugs 87 to seal the openings in the lens 88.

The circumferential edge of lens 88 is provided with an angularly disposed wall 91 adapted to engage the inner surface of the opening 81 of casing 80, which projects beyond the brackets 83. The cylindrical portion of rim 82 terminates into an inwardly projecting portion or flange 92 adapted to engage the exterior surface of the casing 80. Thus, by tightening the screws 84 the wall 91 of lens 88 is drawn into tight engagement with the edge of the casing to form a substantially single line contact therebetween. By providing a casing 80 of comparatively thin sheet material it will be noted that the open end thereof is flexible and will readily conform to the surface of the wall 91 to form a tight waterproof joint.

Figure 16:
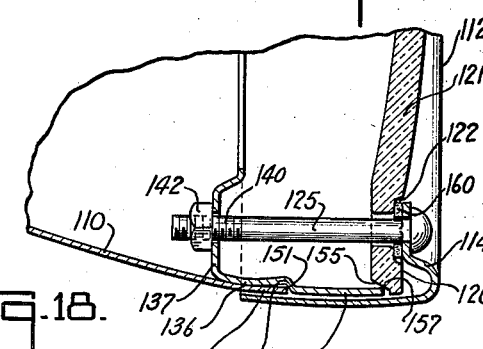
Figure 16 is an enlarged fragmentary detail sectional view taken substantially on a line 16—16 of Figure 15, showing a sealing arrangement of the invention.
Figure 17:
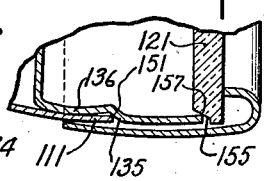
Figure 17 is an enlarged fragmentary detail sectional view of the sealing arrangement taken substantially on a line 17—17 of Figure 15.
Figure 18:
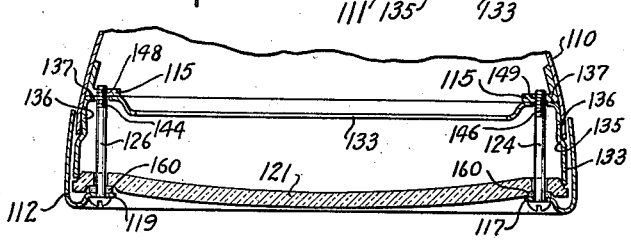
Figure 18 is a detail sectional view taken substantially on a line 18—18 of Figure 15.

Referring to Figures 15 to 18 of the drawings, the arrangement there illustrated as embodying the invention is shown in another form of signal device for vehicles and comprises an outer metallic open ended housing or casing 110 having removably secured at its open end 111, a rim 112. Adjacent the open end 111 of casing 110 are fixedly secured at its inner surface a plurality of brackets or supports 115, as shown in Figure 18, which serve to removably secure rim 112 to casing 110 as will hereinafter appear. A supporting member 128 is secured to the rear face of the casing 110 and serves to secure the device to a convenient portion of an automotive vehicle.

The rim 112 is provided with an inturned or rolled annular edge 114, which is formed with a plurality of inwardly projecting lugs 116, 117, 118 and 119, each having an opening therein. The inner surface of the rolled edge 114 as well as that of lugs 116 to 119 each inclusive, is in engagement with a peripheral flat surface 120 of a lens or light penetrating wall 121 which may be constructed of glass or other suitable material and being provided with suitable recesses such as 122, as shown in Figure 16, to accommodate each of the beforementioned lugs. The lens 121 is formed with suitable openings, which are in alignment with the openings formed in the inwardly projecting lugs in order to allow the passage of bolts 123, 124, 125 and 126, retaining the respective enlarged end portions as in Figure 15.

In order to permit access to the outer end of casing 110 for the purpose of inspecting repairing or replacing the sources of illumination 130 and 131 and any other of the associated parts not shown serving as means to produce visual signals, the rim 112 and lens 121 are so arranged as to form a unitary subassembly removably secured to casing 110. This unitary subassembly includes a ring-like member 133 or inner rim having its end portion in contact with the inner surface of lens 121 and being provided with an angularly displaced surface 135 which is located adjacent to the smaller cylindrical portion 136 adapted to snugly engage the inner surface of the opening 111 of casing 110. The cylindrical portion 136 of rim 133 terminates into an inwardly projecting portion or flange 137 adapted to be engaged by brackets 115. The inwardly turned flange 137 is provided with suitable openings corresponding to the openings formed on rim 112 and lens 121 adapted to permit the passage of the threaded end portions of the securing bolts 123 to 126 inclusive. Bolts 123 and 125 which are located in the same plane are provided with threaded end portion 140 coacting with threaded nuts 142 serving as means to retain in proper relation the unitary sub-assembly comprising the rims 112 and 133 between which is located lens 121, and as means to cause an effective contact between angular portion 155 of lens 121, and inner edge 157 of member 133.

The details of the arrangement including the sealing means are particularly illustrated in Figures 16 to 18 where it can be seen that the inner edge 151 of the end wall 111 of the casing 110 forms an effective line contact with the angularly bent portion 135 of the ring-like member 133. This effective line contact is produced by forcing the casing 110 and removable sub-assembly together by the pressure exerted by tightening of the threaded end portion 144 of the bolts 124 and 126 coacting with the threaded openings 148 and 149 formed on brackets 115 fixedly secured to the casing 110. By this tightening action the circumferentially flexible end portion 111 of the housing 110 tends to climb the angularity of the contacting wall 135 formed on the ring-like member 133, which causes a wedging action on the casing 110, thereby producing a perfect seal wherein all the irregularities of the contacting surfaces are compensated for, eliminating the use of packing members or gaskets between the casing and rim 133. The pressure exerted by tightening bolts 124 and 126 will also be transmitted by inner rim 133 to lens 121, thus causing the slanted or beveled formed portion 155 of lens 121 to be tightly engaged by the inner edge 157 of the end portion of the ring-like member 133. This will urge the circumferentially flexible or deformable edge 157 into an effective line contact with the angularly disposed surface 155 of lens 121 causing an outwardly expanding action of end portion of the rim, producing a perfect engagement of rim 133 and lens 121 thus providing a perfect fit between the contacting surfaces 155 and 157, producing a moisture and water-proof seal without the use of compressible or resilient material.

In order to prevent moisture and foreign matter from entering the casing through the openings in the lens 121 which serves to accommodate the passage of the bolts 123, 124, 125 and 126 which serve to draw the parts together to produce an effective seal as hereinbefore has been pointed out, I provide a washer or gasket of compressible material 160 which snugly surrounds the shank or bolts 123 to 126 inclusive as particularly shown in Figures 16 and 18, preventing ingress of moisture or other foreign matter, thus forming a hermetically sealed moist-proof casing.

Thus the sealing means of the invention used to produce a moist-proof casing having a readily removable closure consists primarily in forming the contacting surface of at least one of the members or elements at an angle or diverging with respect to another so that an edge of the end portion of the engaging member forms a single line contact with the diverging surface with which it is urged into engagement, these contacting surfaces being forced into tight engagement whereby an effective line contact is provided.

It is apparent that, within the scope of the invention, modifications and different arrangements may be made other than is herein disclosed, and the present disclosure is illustrative merely, the invention comprehending all variations thereof.

What we claim is:

1. Sealing means for a light emitting closure including an open ended casing; an annular extension within said casing opening; a light penetrable wall having a conical projection closing said extension; means embracing said casing extension and light penetrable wall; means for urging said conical projection into engagement with said extension; and means for urging said embracing means into engagement with said casing.

2. Sealing means for a light emitting closure including an open ended casing; an annular extension within said casing opening; a light penetrable wall closing said extension, said wall having a projection formed with an angular edge; a rim embracing said extension and said wall; means for urging the angular edge of said projection into engagement with said extension; and means for urging said rim into engagement with said casing.

GUY H. COULTER.
CHARLES E. GODLEY.